US007304656B2

(12) United States Patent
Doyen et al.

(10) Patent No.: US 7,304,656 B2
(45) Date of Patent: Dec. 4, 2007

(54) DEVICE FOR DIGITAL DISPLAY OF A VIDEO IMAGE

(75) Inventors: Didier Doyen, La Bouexiere (FR); Jonathan Kervec, Paimpont (FR); Thierry Borel, Noyal sur Vilaine (FR)

(73) Assignee: Thomson Licensing, Boulogne Billancourt (FR)

( * ) Notice: Subject to any disclaimer, the term of this patent is extended or adjusted under 35 U.S.C. 154(b) by 329 days.

(21) Appl. No.: 10/508,393

(22) PCT Filed: Mar. 10, 2003

(86) PCT No.: PCT/EP03/02408

§ 371 (c)(1),
(2), (4) Date: Sep. 21, 2004

(87) PCT Pub. No.: WO03/081566

PCT Pub. Date: Oct. 2, 2003

(65) Prior Publication Data

US 2005/0168496 A1 Aug. 4, 2005

(30) Foreign Application Priority Data

Mar. 25, 2002 (FR) .................................. 02 03807

(51) Int. Cl.

| | |
|---|---|
| *G09G 5/02* | (2006.01) |
| *G09G 5/10* | (2006.01) |
| *H04N 7/01* | (2006.01) |
| *H04N 11/04* | (2006.01) |

(52) U.S. Cl. ....................... 345/691; 345/696; 345/3.2; 345/541; 345/547; 348/457; 348/439

(58) Field of Classification Search ........ 345/690–691, 345/694, 209, 214, 63, 79, 89, 534, 541, 345/544, 547, 549, 54–55, 692, 204, 696, 345/3.2–3.3; 348/439, 508, 455–457, 513, 348/660, 760, 744, 771

See application file for complete search history.

(56) References Cited

U.S. PATENT DOCUMENTS 6,144,353 A * 11/2000 McKnight .................... 345/94

(Continued)

FOREIGN PATENT DOCUMENTS

EP 1052614 11/2000

(Continued)

OTHER PUBLICATIONS

Patent Abstracts of Japan, vol. 2000, No. 02, Feb. 29, 2000 & JP 11-327492.

(Continued)

*Primary Examiner*—Wesner Sajous
(74) *Attorney, Agent, or Firm*—Joseph J. Laks; Harvey D. Fried

(57) ABSTRACT

The present invention relates to a device for digital display of a video image using time-division modulation. This device is intended to display a video image during a video frame comprising a plurality of consecutive subfields distributed within at least two separate identical time segments. According to the invention, the pixels of the video image change state at most once during each time segment and the video image to be displayed is saved in the image memory in the form of information identifying, for each subfield, the pixels changing state.

13 Claims, 5 Drawing Sheets

*IMAGE MEMORY*

U.S. PATENT DOCUMENTS

| | | | | |
|---|---|---|---|---|
| 6,222,512 | B1* | 4/2001 | Tajima et al. | 345/63 |
| 6,392,656 | B1 | 5/2002 | Someya et al. | |
| 7,106,351 | B2* | 9/2006 | Ito | 345/692 |
| 7,110,008 | B2* | 9/2006 | Katoh et al. | 345/690 |
| 2001/0028347 | A1* | 10/2001 | Kawahara et al. | 345/204 |
| 2002/0047824 | A1* | 4/2002 | Handschy et al. | 345/97 |

FOREIGN PATENT DOCUMENTS

| | | |
|---|---|---|
| JP | 11-327492 | 11/1999 |

OTHER PUBLICATIONS

Search Report Dated Sep. 12, 2003.

* cited by examiner

DEVICE FOR DIGITAL DISPLAY OF A VIDEO IMAGE

This application claims the benefit, under 35 U.S.C. § 365 of International Application PCT/EP03/02408, filed Mar. 10, 2003, which was published in accordance with PCT Article 21(2) on Oct. 2, 2003 in English and which claims the benefit of French patent application No. 0203807, filed Mar. 25, 2002.

DETAILED DESCRIPTION OF THE INVENTION

The present invention relates to a device for digital display of a video image using time-division modulation to display grey levels on the screen. The invention applies most particularly to projection and rear-projection appliances, televisions or monitors.

Among display devices, digital display devices are devices comprising one or more cells which can take a finite number of illumination values. Currently, this finite number of values is equal to two and corresponds to an on state and an off state of the cell. To obtain a larger number of grey levels, it is known to temporally modulate the state of the cells over the video frame so that the human eye, by integrating the pulses of light resulting from these changes of state, can detect intermediate grey levels.

Among the known digital display devices, there are those comprising a digital micromirror matrix or DMD matrix (DMD standing for Digital Micromirror Device). A DMD matrix is a component, conventionally used for video-projection, which is formed of a chip on which are mounted several thousand microscopic mirrors or micromirrors which, controlled on the basis of digital data, serve to project an image onto a screen, by pivoting in such a way as to reflect or to block the light originating from an external source. The technology based on the use of such micromirror matrices and consisting in a digital processing of light is known as “Digital Light Processing” or DLP.

The invention will be more particularly described within the framework of digital display devices comprising a digital micromirror matrix without this implying any limitation whatsoever on the scope of the invention to this type of device. The invention can for example also be applied to digital devices of the LCOS type.

In DLP technology, one micromirror per image pixel to be displayed is provided. The micromirror exhibits two operating positions, namely an active position and a passive position, on either side of a quiescent position. In the active position, the micromirror is tilted by a few degrees (around 10 degrees) with respect to its quiescent position so that the light originating from the external source is projected onto the screen through a projection lens. In the passive position, the micromirror is tilted by a few degrees in the opposite direction so that the light originating from the external source is directed towards a light absorber. A cell in the active (respectively passive) position corresponds to a pixel of the image in an on (respectively off) state. The periods of illumination of a pixel therefore correspond to the periods during which the associated micromirror is in the active position.

Thus, if the light supplied to the micromirror matrix is white light, the pixels corresponding to the micromirrors in the active position are white and those corresponding to the micromirrors in the passive position are black. The intermediate grey levels are obtained by time-division modulation of the light projected onto the screen corresponding to a PWM modulation (PWM standing for Pulse Width Modulation). Specifically, each micromirror is capable of changing position several thousand times a second. The human eye does not detect these changes of position, nor the light pulses which result therefrom, but integrates the pulses between them and therefore perceives the average light level. The grey level detected by the human eye is therefore directly proportional to the time for which the micromirror is in the active position in the course of a video frame.

To obtain 256 grey levels, the video frame is for example divided into eight consecutive sub-periods of different weights. These sub-periods are commonly called subfields. During each subfield, the micromirrors are either in an active position, or in a passive position. The weight of each subfield is proportional to its duration. FIG. 1 shows an exemplary distribution of the subfields within a video frame. The duration of the video frame is 16.6 or 20 ms depending on the country. The video frame given as an example comprises eight subfields of respective weights 1, 2, 4, 8, 16, 32, 64 and 128. The periods of illumination of a pixel correspond to the subfields during which the associated micromirror is in an active position. The human eye temporally integrates the pixel illumination periods and detects a grey level proportional to the overall duration of the illumination periods in the course of the video frame.

Furthermore, as in all video appliances, the displaying of a colour image requires the displaying of three images—one red, one blue and one green. In projectors with single DMD matrix, these three images are displayed sequentially. Such projectors comprise for example a rotating wheel comprising red, green and blue filters through which the white light originating from the source of the projector is filtered before being transmitted to the DMD matrix. The DMD matrix is thus supplied sequentially with red, green and blue light during the video frame. The rotating wheel comprises for example six filters (two red, two green, two blue) and rotates at a frequency of 150 revs/second, i.e. three revolutions per video frame. The digital data of the R, G and B components of the video image are supplied to the DMD matrix in a manner which is synchronized with the red, green and blue light so that the R, G and B components of the image are displayed with the appropriate light. The video frame can therefore be chopped into 18 time segments, 6 for each colour, as illustrated in FIG. 2. In the case of a video frame of 20 ms, the duration of each segment is around 1.1 ms. The subfields shown in FIG. 1 are distributed, for each colour, over the 6 time segments of each colour. Each subfield is for example chopped into six elementary periods, each tied to a particular time segment.

These digital display devices exhibit problems related to the temporal integration of the illumination periods. A contouring problem appears in particular when an object moves between two consecutive images. This problem, well known to the person skilled in the art, is manifested by the appearance of darker or lighter bands on grey level transitions which are normally almost imperceptible.

To limit these contouring effects, it is possible to employ so-called incremental coding of the grey levels, as is described in French patent application No. 02/03141 filed on 7 Mar. 2002.

According to this coding, the cells of the digital display device change state (on or off) at most once during each segment of the video frame. In the case of a DMD matrix, this implies that the micromirrors of the DMD matrix change position at most once during each segment of the video frame. Thus, if a micromirror is in an active position at the start of a segment and switches to a passive position in the course of this segment, it remains in this position until the end of the segment. More exactly, if a micromirror of the DMD matrix is in an active position at the start of a time segment and switches to a passive position at the start of a subfield of this time segment, it retains this position during the remaining subfields of the time segment.

The main advantage of this coding is that it does not create any “time holes” in the segment, the said holes being generators of disturbances during the temporal integration. A time hole designates an “on” subfield (subfield during which the pixel exhibits a non zero grey level) between two off subfields (subfields during which the pixel exhibits a zero grey level) or vice versa.

However, this coding allows the display of only a restricted number of possible grey levels, namely, for a segment comprising N subfields, it allows the display of a maximum of N+1 grey level values. However, techniques of dithering or of noising, which are well known to the person skilled in the art, make it possible to compensate for this small number of grey levels. The principle of the “dithering” technique consists in decomposing each non displayable grey level into a combination of displayable grey levels which, through temporal integration (these grey levels are displayed on several successive images) or through spatial integration (these grey levels are displayed in an area of the image encompassing the relevant pixel), restore on the screen a grey level close to the sought-after non displayable grey level.

A digital display device implementing this incremental coding is represented in FIG. 3. This device comprises an incremental coding module 10, a module 11 for transforming video level streams into binary planes, an image memory 12 and a DMD matrix 14 with its addressing mechanism 13. The incremental coding module 10 comprises a dithering circuit 100 for adding random values to the video levels received by the module 10 and a quantization circuit 110 for subsequently limiting the number of values of video levels of the video data. These two circuits are in fact intended to implement the “dithering” technique. The algorithm implemented in the error broadcasting circuit 100 is for example that of Floyd and Steinberg. At the end of quantization, the video levels are for example coded on 6 bits so as to display for example 61 different levels (case where each of the 6 time segments of each colour comprises 10 subfields). The stream of video levels thus coded is subsequently processed by the module 11 which can be defined as an LUT table receiving as input video levels coded on 6 bits and delivering as output video levels coded on 60 bits (10 bits for each segment, i.e. 1 bit per subfield), each of the 60 bits referring to a binary plane and each binary plane defining the state of the set of the pixels of the video image (or of the cells of the matrix 14) during a subfield. A 1 bit of the binary plane corresponds for example to a pixel of the image in an on state (or to a micromirror in the active position) and a 0 bit to a pixel of the image in an off state (or to a micromirror in the passive position). The binary planes are stored separately in the image memory 12. These binary planes are used by the addressing mechanism 13 of the DMD matrix 14 to display the video image.

The present invention proposes another way of saving the video image in the image memory of the device.

According to the invention, it is proposed that, for each subfield, information identifying the pixels changing state be saved in the image memory, rather than saving video levels.

Also, the invention relates to a digital display device serving to display a video image during a video frame comprising a plurality of consecutive subfields distributed within at least two separate identical time segments, each pixel of the video image being able selectively to take an on state or an off state during each subfield of the said video frame, the said device comprising a matrix of elementary cells for displaying the pixels of the video image, and an image memory for storing the video image before its display by the matrix of elementary cells, characterized in that the pixels of the video image change state at most once during each time segment and in that the video image to be displayed is saved in the image memory in the form of information identifying, for each subfield, the pixels changing state.

If the video frame comprises N subfields, the image memory comprises, for example, N memory areas each associated with a subfield and each memory area saves the coordinates of the pixels of the video image changing state during the subfield associated therewith.

If each time segment comprises P subfields arranged in the same order and if each pixel of the video image changes state during the subfields of same order in the said at least two time segments, the image memory advantageously comprises P memory areas each associated with one of the P subfields and saving the coordinates of the pixels of the video image changing state during the associated subfield. Each memory area of the said image memory then is read once per time segment to display the video image.

BRIEF DESCRIPTION OF THE DRAWINGS

Other characteristics and advantages of the invention will become apparent from reading the detailed description which follows and which is given with reference to the appended drawings, in which.

DETAILED DESCRIPTION

According to the invention, it is envisaged that information identifying, for each subfield, the pixels changing state be saved in the image memory, instead of saving video levels. This image memory therefore now saves only information pertaining to pixels of the video image changing state in the course of the time segments of the video frame.

The image memory is divided into as many memory areas as there are subfields in the 18 time segments (6 per colour). Each memory area is associated with a subfield and stores the row and column coordinates of the pixels of the image changing state at the start of this subfield.

Figure 4:
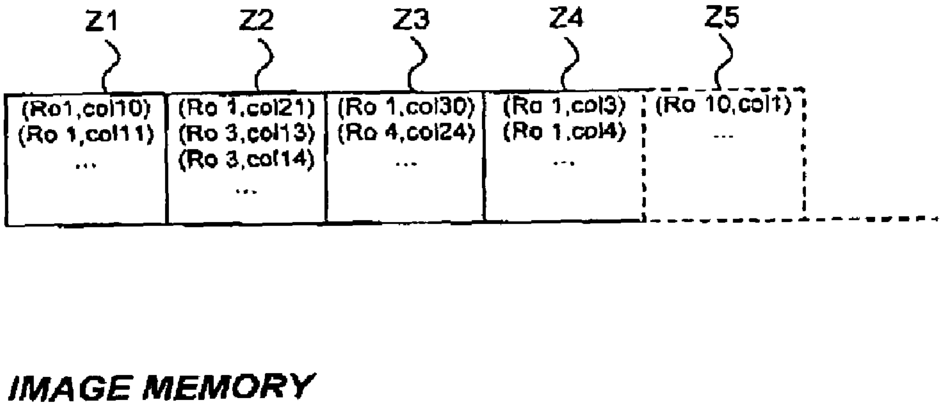
FIG. 4 shows the content of the image memory in a digital display device according to the invention.

The content of an image memory according to the invention is shown in FIG. 4. The memory comprises a plurality of memory areas Zi, i∈[1 . . . N] and N being equal to the total number of subfields in the video frame. Each area Zi comprises the row and column coordinates of the pixels which change state during the associated subfield. In this example, the pixel of row 1 and of column 10 of the matrix changes state during the first subfield. The same holds for the pixel of row 1 and of column 11.

The size of the memory areas Zi can be fixed. If one considers images comprising 768×1024 pixels, the coordinates of the pixels being moreover coded on 20 bits (10 bits for the row position and 10 bits for the column position), it is then necessary to envisage memory areas having a size equal to 1024×768×20=15.7 megabits. If the image is displayed with 60 subfields (ten subfields per time segment), for each of the three colours R, G, B, the total size required for the image memory is then equal to 1024×768×20×60×3=2.8 gigabits.

Figure 5:
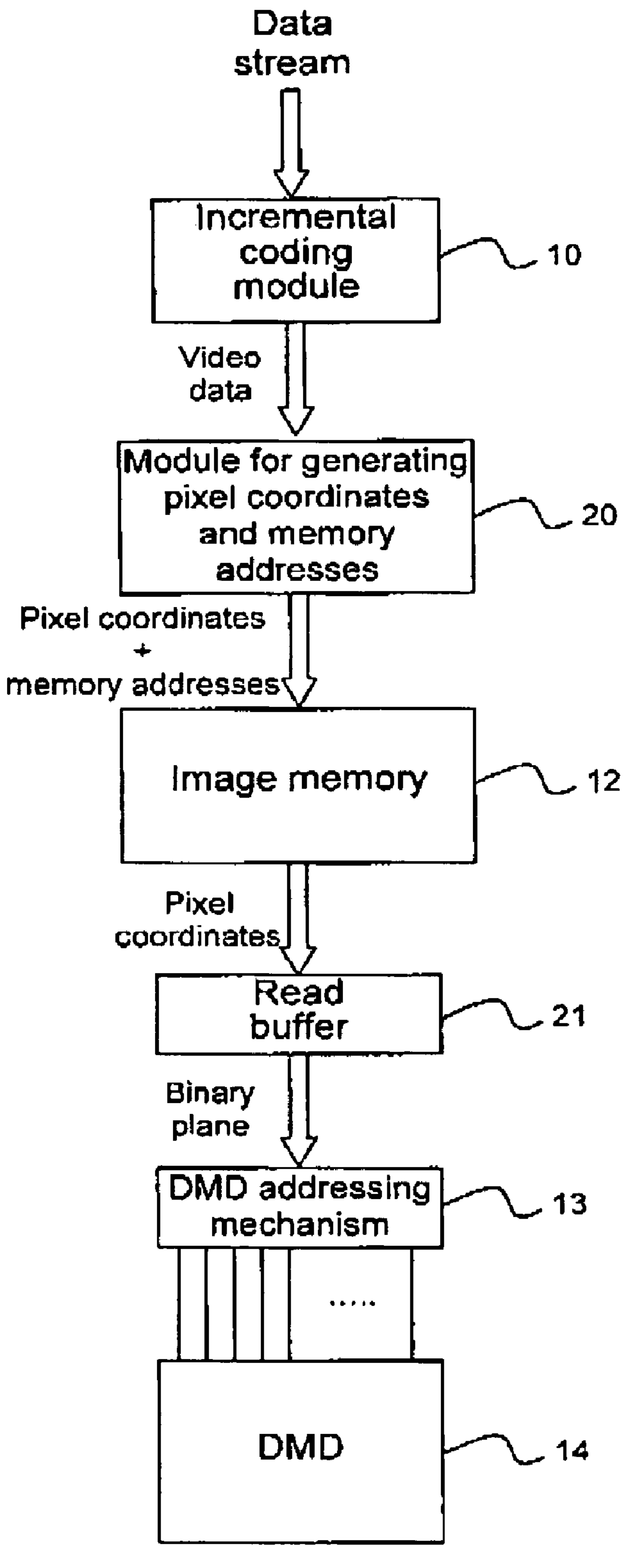
FIG. 5 represents a first functional diagram of a digital display device with DMD matrix in accordance with the invention.

FIG. 5 shows a first functional diagram of a digital display device in accordance with the invention in which the size of the areas Zi of the image memory 12 is fixed. The elements of FIG. 5 which are already presented in FIG. 3 bear the same reference number in the two figures.

Figure 1:
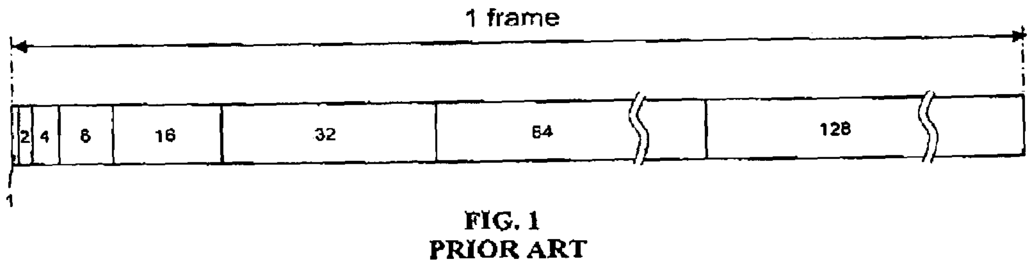
FIG. 1 PRIOR ART
FIG. 1 represents an exemplary distribution of the subfields within a video frame for a digital display device with pulse width modulation (PWM)
Figure 2:
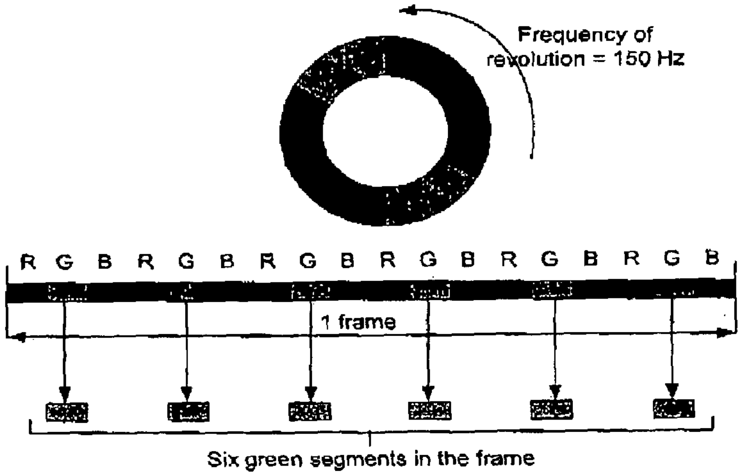
FIG. 2 PRIOR ART
FIG. 2 represents a conventional video frame for colour image display by a digital display device with DMD matrix, the video frame comprising 6 time segments for each colour.
Figure 3:
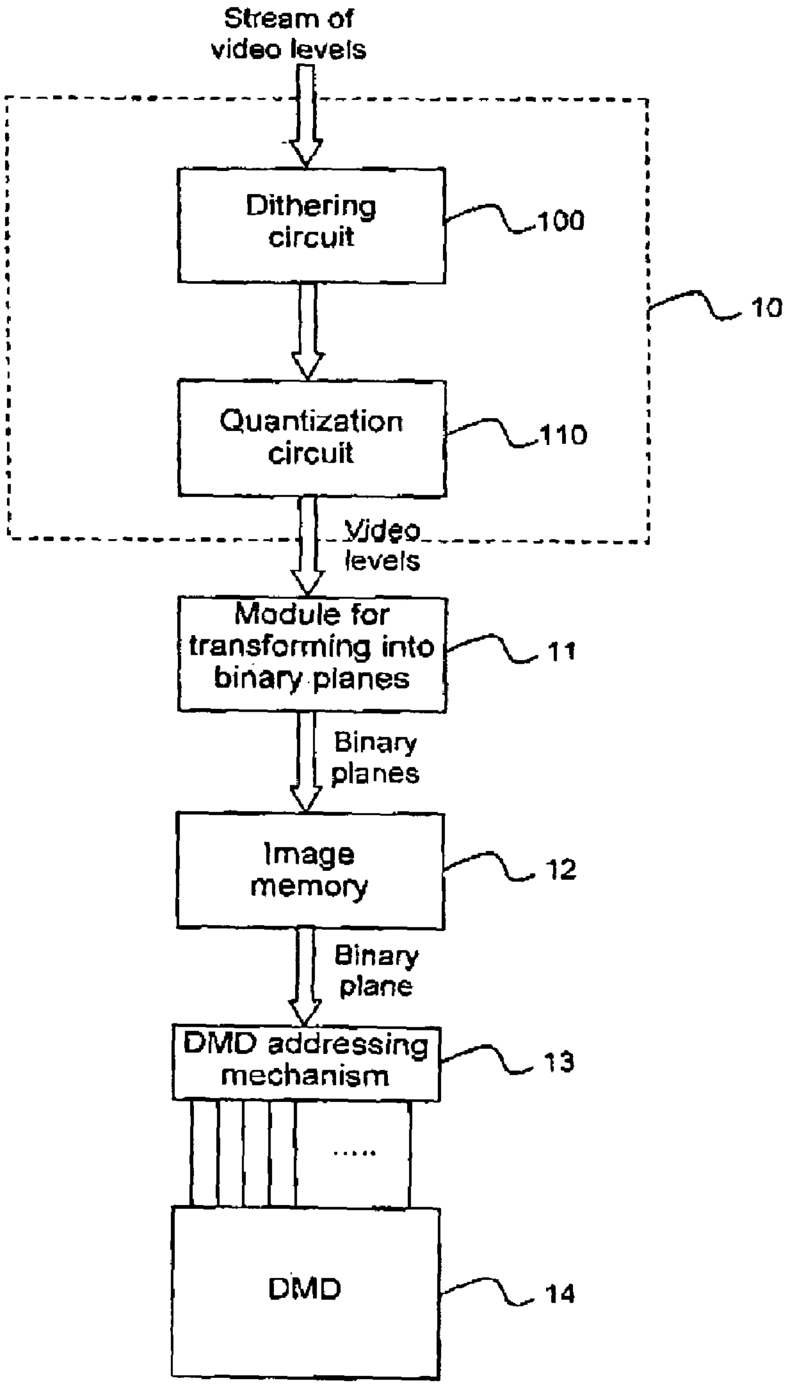
FIG.3 PRIOR ART
FIG. 3 represents a functional diagram of a digital display device with DMD matrix of the prior art.

This device comprises an incremental coding module 10 in accordance with that of FIG. 3. The module 10 receives video levels as input and delivers incrementally coded video levels as output (the pixels change state at most once during a time segment).

The video levels emanating from the incremental coding module 10 are subsequently supplied to a calculation module 20 responsible for generating, for each pixel (represented by its video level) of the image in the stream of video levels, its row and column coordinates as a function of its position in the said stream and for defining at least one address at which to record them in the image memory. The pixel coordinates are recorded several times in the memory if the relevant pixel changes state during several time segments of the video frame. To calculate the address at which to record, for each time segment, the coordinates of a given pixel P, the module 20 determines the subfield in the course of which the pixel P changes state (this subfield is dependent on the video level of the pixel P) and selects an unused address in the memory area associated with this subfield.

For example, if the pixel P is the third pixel of the video stream to change state during the third subfield of the first time segment, the module 20 appends to it, in the memory area associated with this subfield, an address corresponding to the third memory location of the area.

The coordinates of the pixels changing state during the relevant video frame are thus recorded in the image memory 12 at the addresses determined by the module 20.

The image memory 12 is a very fast RAM memory, for example an SDRAM. It is read area by area so as to construct, for each subfield, a binary plane in a read buffer circuit 21. For each subfield, the read buffer circuit 21 creates a binary plane from the pixel coordinates recorded in the memory area associated with the relevant subfield. The circuit 21 sets for example to 1 the bits of the binary plane whose coordinates are present in the memory area read. The other bits of the binary plane do not change state. It should be noted that at the start of the time segments, all the bits of the binary plane are in this case at zero.

The binary planes of the various subfields of the various time segments are subsequently supplied to the addressing mechanism 13 of the DMD matrix 14 to display the video image.

Figure 6:
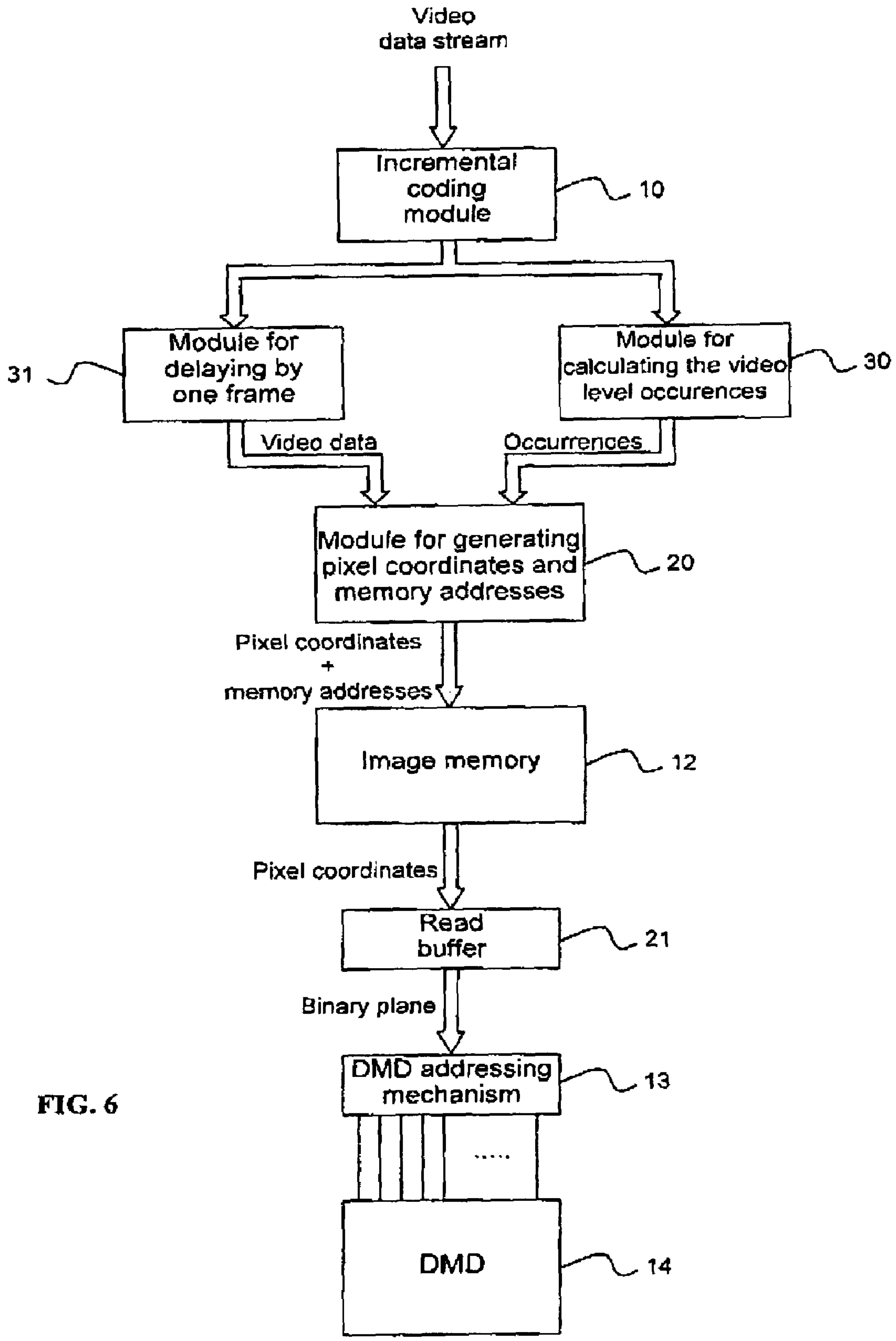
FIG. 6 represents a second functional diagram of a digital display device with DMD matrix in accordance with the invention.

It is possible to operate the device with an image memory 12 of reduced size. To do this, it is necessary to determine, prior to recording the pixel coordinates in the image memory 12, the number of pixels to be recorded in each of the areas of the image memory 12. It will then be possible to determine the memory size required for each of them. This embodiment is illustrated by FIG. 6. Given that the coordinates of the pixels of the video stream are recorded at most 6 times (once per time segment) in the image memory, the size of the image memory needed to implement this embodiment is equal to: 6×20×1024×768×3=283.1 megabits.

In this embodiment, a module for calculating the occurrences of video level 30 is inserted between the incremental coding module 10 and the module for generating pixel coordinates and memory addresses 20. The module 30 is responsible for calculating the number of occurrences of each video level in the stream of data received during a video frame. These numbers of occurrences are used in the module 20 to calculate, for each subfield, the number of pixels which change state and to deduce therefrom the memory size of each area. It should be noted that pixels having different video levels may change state at the start of the same subfield of a given time segment (they will switch at different subfields for at least one of the other 6 time segments). Each memory area may therefore enclose the coordinates of pixels not having the same video level. The module 20 then totals the number of occurrences of these various video levels to determine the size of the memory area.

Moreover, the stream of video levels which emanates from the incremental coding module 10 is still supplied to the calculation module 20 but with a delay video frame. This delay is effected by a delay module 31 placed between the module 10 and the module 20. The video data output by the module 10 has to be delayed by one frame so that the numbers of occurrences received by the module 20 correspond to the video data which it receives.

For the calculation of the memory addresses in the module 20, the device of FIG. 6 operates in the following manner. If the area Z1 begins at the address 0000 and if there are 16 pixels changing at the start of the subfield associated with the area Z1, the coordinates of these 16 pixels are therefore to be recorded at the first 16 addresses of the memory 12 in their order of appearance in the video stream and the area Z2 begins at the 17th address of the image memory.

To limit the bandwidth of the image memory 12, the 6 time segments of the video frame advantageously comprise, for each pixel, the same item of video information (the video level is distributed uniformly over the 6 time segments). Each pixel then changes state in the course of the same subfield in the 6 time segments. The pixel coordinates can then be written just once to the image memory during the video frame and read 6 times (once per time segment). In this embodiment, the image memory 12 then comprises only P memory areas, P being the number of subfields per time segment for the three colours.

The bandwidth required for the operation of reading the image memory 12 is then equal to:

$$BP_{read} = \text{number of segments} \times \text{number of position bits} \times \text{number of pixels} \times \text{number of frames per second} \times \text{number of colours}$$

-continued $$= 6 \times 20 \times 768 \times 1024 \times 50 \times 3$$

$$= 14.14 \text{ Gbit/s}$$

For the write operation, it is 6 times smaller, i.e.:

$$BP_{write} = BP_{read} / 6$$

$$= 2.36 \text{ Gbit/s}$$

I.e. a total bandwidth $BP_{total}$ equal to 16.5 Gbit/s.

This value is very high but can be further reduced. Specifically, the row and column coordinates do not have to be written for all the pixels. Statistically, even if the image comprises a large number of different video levels, there is a very high probability of there being several pixels per row having the same video level. It is therefore proposed that the row coordinate be written, to the memory area, once only and that the column coordinates of the pixels of this row having the same video level be bracketed therewith as in the example hereinbelow:

Row1:column20/column21/column22/

In the case where the 768 row positions are written to the 60 areas of the memory, we then obtain:

$$BP_{read} = 768 \times 10 \times 60 \times 50 \times 3 + 1024 \times 768 \times 10 \times 6 \times 50 \times 3$$

$$= 7.14 \text{ Gbit/s}$$

$$BP_{write} = 1.19 \text{ Gbit/s}$$

I.e. a total bandwidth $BP_{total}$ equal to 10.3 Gbit/s.

It is also conceivable to act on the number of possible video levels or on the number of subfields per time segment to further decrease the bandwidth.

Moreover, the duration of the subfields associated with the areas of the image memory is advantageously defined by a so-called inverse gamma correction curve. The inverse gamma correction designates the correction to be applied to an image from a camera in order for this image to be displayed correctly on the screen of a linear digital display device. Specifically, in contradistinction to cathode ray tubes, the ratio between the video levels at the input (original image) and the video levels at the output of the digital display device is in general linear. Now, given that a gamma correction is carried out on the source image at the camera level, an inverse gamma correction must be applied to the image from the camera in order to obtain correct display of the image on the screen. This inverse gamma correction is therefore implemented by acting on the duration of the subfields associated with the various areas of the image memory.

Figure 7:
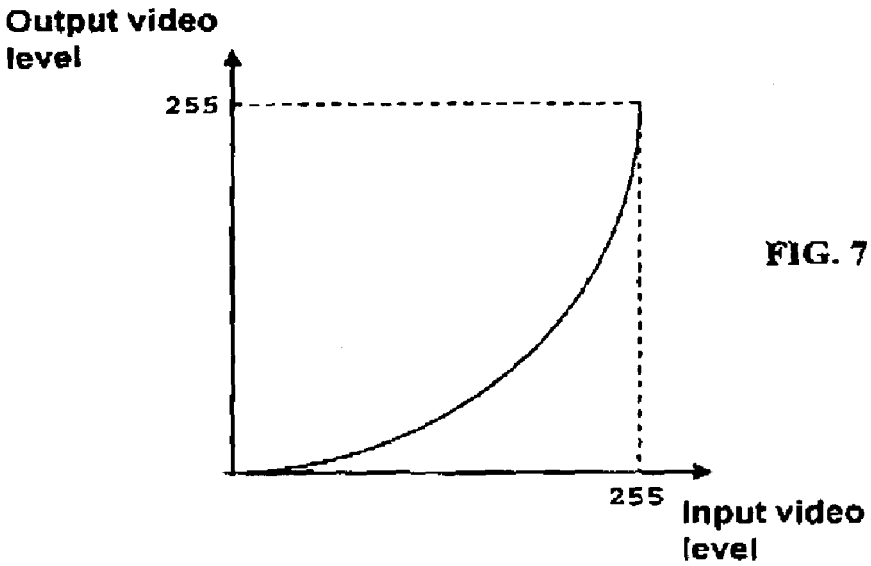
FIG. 7 shows an inverse gamma correction curve.

The shape of an inverse gamma correction curve is shown in FIG. 7.

The invention claimed is:

1. A digital display device serving to display a video image during a video frame comprising a plurality of consecutive subfields distributed within at least two separate identical time segments, each pixel of the video image being able selectively to take an on state or an off state during each subfield of the said video frame and each pixel of the video image changing state at most once during each time segment, the device comprising:

a matrix of elementary cells for displaying the pixels of the video image; and, an image memory for storing the video image before its display by the matrix of elementary cells, said memory comprising N memory areas each associated with a subfield and saving the coordinates of the pixels of the video image changing state during the associated subfield.

2. The device device according to claim 1, wherein the said at least two time segments of the video frame are identical and comprise the same number of subfields.

3. The device according to claim 1, wherein it comprises means for generating, from the information stored in the image memory, binary planes for each subfield.

4. The device Devise according to claim 1, wherein it comprises means for determining the coordinates of a pixel of the video image changing state in the course of the video frame and for appending thereto an address in the memory area referring to the subfield during which said pixel changes state.

5. The device according to claim 1, wherein, the pixels of the video image being organized in rows and columns in the video image, the pixel coordinates saved in the image memory consist, for each pixel, of a row coordinate and a column coordinate.

6. A digital display device serving to display a video image during a video frame comprising a plurality of consecutive subfield distributed within at least two separate identical time segments each pixel of the subfield of the said video frame and each pixel of the video image changing state at most once during each time segment, the device comprising:

a matrix of elementary cells for displaying the pixels of the video image;

an image memory for storm the video image before its display the matrix of elementary cells, said memory comprising N memo areas each associated with a subfield and saving the coordinates of the pixels of the video image changing state during the associated subfield; and, means for calculating, for each video level of the pixels of the video image, its number of occurrences in the video image, which numbers of occurrences are supplied to the memory address and pixel coordinate generating means so as to determine the addresses to be appended to the pixel coordinates.

7. A digital display device serving to display a video image during a video frame comprising a plurality of consecutive subfields distributed within at least two separate identical time segments, each pixel of the video image being able selectively to take an on state or an off state during each subfield of the said video frame and each pixel of the video image changing state at most once during each time segment, the device comprising:

a matrix of elementary cells for displaying the pixels of the video image;

an image memory for storing the video image before its display by the matrix of elementary cells, said memory comprising N memory areas each associated with a subfield and saving the coordinates of the pixels of the video image changing state during the associated subfield;

the pixels of the video image are organized in rows and columns in the video image, and, each area of the image memory encloses for all the pixels belonging to one and the same row of said image and changing state during the associated subfield, a common row coordinate and, for each of said pixels, a column coordinate.

8. A digital display device serving to display a video image during a video frame comprising a plurality of N consecutive subfields distributed within at least two separate identical time segments, each time segment comprising P subfields arranged in the same order, each pixel of the video image being able selectively to take an on state or an off state during each subfield of the said video frame and each pixel of the video image changing state at most once during each time segment and each pixel changing state during the subfields of same order in the said at least two time segments, the device comprising:

a matrix of elementary cells for displaying the pixels of the video image; and, an image memory for storing the video image before its display by the matrix of elementary cells, said memory comprising P memory areas each associated with one of the P subfields and saving the coordinates of the pixels of the video image changing state during the associated subfield, each memory area of said image memory then being read once per time segment to display the video image.

9. The device according to claim 8, wherein it comprises means for generating, from the information stored in the image memory, binary planes for each subfield.

10. The device according to claim 8, wherein it comprises means for determining the coordinates of a pixel of the video image changing state in the course of the video frame and for appending thereto an address in the memory area referring to the subfield during which said pixel changes state.

11. A digital display device serving to display a video image during a video frame comprising a plurality of N consecutive subfields distributed within at least two separate identical time segments, each time segment comprising P subfields arranged in the same order, each pixel of the video image being able selectively to take an on state or an off state during each subfield of the said video frame and each pixel of the video image changing state at most once during each time segment and each pixel changing state during the subfields of same order in said at least two time segments, the device comprising:

a matrix of elementary cells for displaying the pixels of the video image;

an image memory for storing the video image before its display by the matrix of elementary cells, said memory comprising P memory areas each associated with one of the P subfields and saving the coordinates of the pixels of the video image changing state during the associated subfield, each memory area of the said image memory then being read once per time segment to display the video image;

means for determining the coordinates of a pixel of the video image changing state in the course of the video frame and for appending thereto an address in the memory area referring to the subfield during which the said pixel changes state; and, means for calculating, for each video level of the pixels of the video image, its number of occurrences in the video image, which numbers of occurrences are supplied to the memory address and pixel coordinate generating means so as to determine the addresses to be appended to the pixel coordinates.

12. The device according to claim 8, wherein, the pixels of the video image being organized in rows and columns in the video images the pixel coordinates saved in the image memory consist, for each pixel, of a row coordinate and a column coordinate.

13. A digital display device serving to display a video image during a video frame comprising a plurality of N consecutive subfields distributed within at least two separate identical time segments, each time segment comprising P subfields arranged in the same order, each pixel of the video image being able selectively to take an on state or an off state during each subfield of the said video frame and each pixel of the video image changing state at most once during each time segment and each pixel changing state during the subfields of same order in said at least two time segments, the device comprising:

a matrix of elementary cells for displaying the pixels of the video image;

an image memory for storm the video image before its display by the matrix of elementary cells, said memory comprising P memory areas each associated with one of the P subfields and saving the coordinates of the pixels of the video image changing state during the associated subfield, each memory area of the said image memory then being read once per time segment to display the video image;

the pixels of the video image are organized in rows and columns in the video; and, each area of the image memory encloses, for all the pixels belonging to one and the same row of said image and changing state during the associated subfield, a common row coordinate and, for each of said pixels, a column coordinate.

* * * * *